US 6,317,839 B1

(12) United States Patent
Wells

(10) Patent No.: US 6,317,839 B1
(45) Date of Patent: Nov. 13, 2001

(54) METHOD OF AND APPARATUS FOR CONTROLLING SUPPLY OF POWER TO A PERIPHERAL DEVICE IN A COMPUTER SYSTEM

(75) Inventor: Robert Marion Wells, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/234,142

(22) Filed: Jan. 19, 1999

(51) Int. Cl.$^7$ ........................................... G06F 1/26
(52) U.S. Cl. ................................................. 713/320
(58) Field of Search ................... 713/300–340

(56) References Cited

U.S. PATENT DOCUMENTS

| | | | |
|---|---|---|---|
| 3,573,774 | 4/1971 | Oben | 340/199 |
| 4,070,554 | * 1/1978 | Rule et al. | 379/28 |
| 4,077,030 | 2/1978 | Helava | 340/183 |
| 4,204,249 | 5/1980 | Dye et al. | 364/200 |
| 4,228,422 | 10/1980 | Perry | 340/310 |
| 4,383,184 | * 5/1983 | McFarland | 307/66 |
| 4,532,510 | 7/1985 | Bertrand | 340/870 |
| 4,635,057 | 1/1987 | Schaefer | 340/870 |
| 4,736,119 | * 4/1988 | Chen et al. | 327/143 |
| 4,823,290 | 4/1989 | Fasack et al. | 364/550 |
| 4,914,656 | * 4/1990 | Dunphy, Jr. et al. | 714/710 |
| 4,980,836 | 12/1990 | Carter et al. | . |
| 5,136,281 | 8/1992 | Bonaquist | 340/644 |
| 5,198,806 | 3/1993 | Lord | 340/825.31 |
| 5,301,122 | 4/1994 | Halpern | 364/483 |
| 5,383,224 | * 1/1995 | Mizoguchi | 375/99 |
| 5,396,636 | 3/1995 | Gallagher et al. | 395/750 |
| 5,450,073 | 9/1995 | Brown | 340/825.07 |
| 5,452,277 | * 9/1995 | Bajorek et al. | . |
| 5,566,316 | * 10/1996 | Fechner et al. | 711/114 |
| 5,574,920 | * 11/1996 | Parry | . |
| 5,581,724 | * 12/1996 | Belsan et al. | . |
| 5,586,271 | * 12/1996 | Parrett | 710/103 |
| 5,768,623 | 6/1998 | Judd et al. | 395/857 |
| 5,798,716 | 8/1998 | Davis | 341/26 |
| 5,812,754 | * 9/1998 | Lui et al. | 714/6 |

(List continued on next page.)

FOREIGN PATENT DOCUMENTS

| | | |
|---|---|---|
| 0 666 529 A1 | 1/1995 | (EP) . |
| 0 952 530 A2 | 4/1999 | (EP) . |
| 2 295 041 A | 7/1994 | (GB) . |

OTHER PUBLICATIONS

IBM Technical Disclosure Bulletin, vol. No. 7, 12/88 Processor Power Control and Monitoring System.
IBM Technical Disclosure Bulletin, vol. No. 9, 2/89 Remote Power–On Control/Power Fail Indication System.

*Primary Examiner*—Paul R. Myers
(74) *Attorney, Agent, or Firm*—Altera Law Group, LLC

(57) ABSTRACT

A peripheral device, such as a data storage device, is employed in a computer system having one or more computers. The computer system includes an interface architecture, such as Fiber channel or Serial Storage Architecture (SSA), providing a continuously clocked serial link. The data storage device includes a power supply and data storage components, such as disk drives, carried in a housing. One or more data communication interfaces, each of which is adapted for coupling with a computer through conductors, are carried on the housing and coupled to the data storage components. The data storage components have a substantially powered up state and a substantially powered down state which is entered in response to a power down signal. Detector circuitry is operative to detect a clock signal loss at each one of the data communication interfaces and to produce the power down signal responsive to the detection.

20 Claims, 7 Drawing Sheets

U.S. PATENT DOCUMENTS 5,898,828 * 4/1999 Pignolet et al. .................... 370/311
5,964,878 * 10/1999 Ryu .
5,975,738 * 11/1999 DeKoning et al. ................. 364/184
6,012,124 * 1/2000 Kamo et al. ........................ 711/114
6,078,193 * 6/2000 Bazuin et al. ........................ 326/93

* cited by examiner

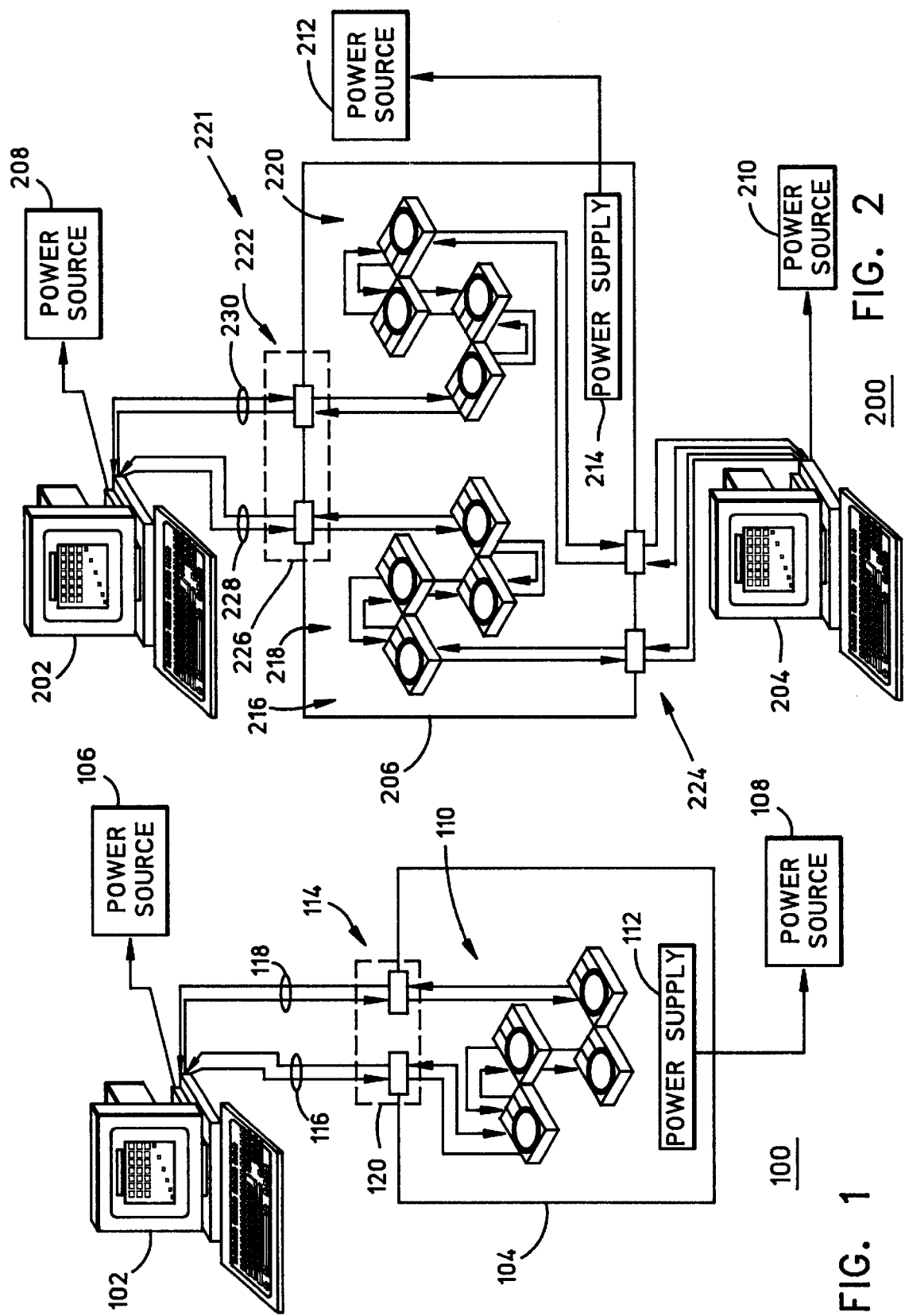

METHOD OF AND APPARATUS FOR CONTROLLING SUPPLY OF POWER TO A PERIPHERAL DEVICE IN A COMPUTER SYSTEM

BACKGROUND OF THE INVENTION

1. Field of the Invention

The present invention relates generally to the field of controlling the supply of electrical power to a peripheral device in a computer system.

2. Description of the Related Art

The growth of computer use has created an increasing demand for flexible, high availability devices to store data for computers. Many enterprises have a multiplicity of host computers including personal computers, workstations, and servers that either function independently or are connected through a network. It is desirable for the multiple host computers to be able to access a common pool of data storage so that data can be accessed by all of the host computers. Such an arrangement increases the total amount of data available to any one host computer.

Data storage devices of these systems may be situated at remote locations to free up space near the computer hosts and/or to protect backup data. When not needed for use, however, the data storage devices are inconvenient to manually power down at the remote location.

Remote power control has been implemented, but with use of dedicated power control lines extending long distances from a host computer to the peripheral device. Remote power control has also been implemented using power up/down commands from the host, requiring complex software at the host and complex command interpreters at the peripheral.

Accordingly, there is an existing need for a remote and automatic power control apparatus for a computer system, and more particularly an apparatus that overcomes the deficiencies of conventional power control.

SUMMARY OF THE INVENTION

One object of the present invention is to provide a remote and automatic power control apparatus. A peripheral device, such as a data storage device, is utilized in a computer system having any number computers and communicative over a continuously clocked serial link. The continuously clocked serial link may be provided through a suitable interface architecture, such as Fibre channel or Serial Storage Architecture (SSA). A power supply and data storage components, such as disk drives, are carried in a housing. The data communication interfaces, each of which is adapted for coupling with a computer through conductors, are carried on the housing and coupled to the data storage components. The data storage components have a substantially powered up state and a substantially powered down state entered in response to a power down signal. Detector circuitry is operative to detect a clock signal loss at each one of the data communication interfaces and to produce the power down signal responsive to the detection. Thus, a data storage device may be automatically powered down in response to each one of the computers being powered down.

Preferably, the remote and automatic power control apparatus employs no special hardware or software at the host, no special software at the peripheral, and only a small amount of simple hardware at the peripheral.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein:

FIG. 1 is an illustration of a computer system having a computer and a peripheral device;

FIG. 2 is an illustration of another computer system having a plurality of computers and a peripheral device;

DETAILED DESCRIPTION OF THE PREFERRED EMBODIMENTS

Figure 3:
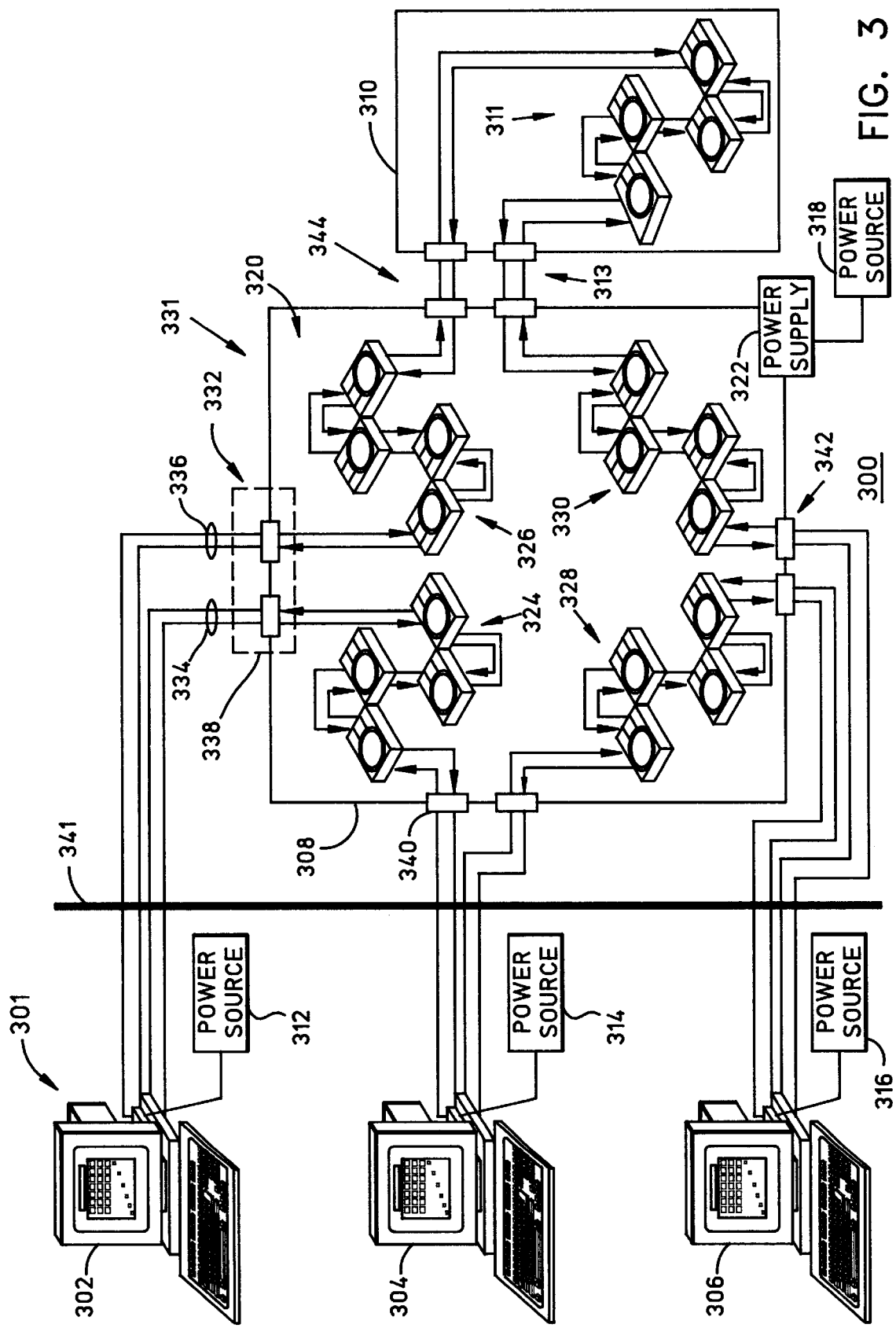
FIG. 3 is an illustration of another computer system having a plurality of computers and a plurality of peripheral devices.

FIGS. 1, 2, and 3 are illustrations of computer systems 100, 200, and 300, respectively, each of which may embody some form of the present invention. Three computer systems are shown to illustrate a few possible configurations; many other configurations are realizable as one skilled in the art will readily understand. In practice, a larger number of computers are typically employed in a computer system.

In FIG. 1, computer system 100 includes a computer 102 and a peripheral device 104. Computer 102 is electrically powered from a power source 106, whereas peripheral device 104 is electrically powered from a power source 108. Peripheral device 104 has peripheral device components 110 and a power supply 112, both of which are carried and disposed in a housing designated by solid line boundaries of FIG. 1. The housing (and housings described below) may be any suitable structure for partially or completely covering and carrying such components, and is preferably made from a durable material such as metal. Power supply 112 is detachably connectable with power source 108 through a power source interface (not shown in FIG. 1), which may include a power cord adapted for coupling to an alternating current (AC) outlet. Peripheral device 104 has a data communication interface 114 carried with the housing and coupled to peripheral device components 110. Data communication interface 114 may include connectors and be carried on an adapter card 120 (designated by dashed lines of FIG. 1), which is typically detachably connectable to peripheral device 104.

Computer 102 is coupled to and communicates with peripheral device components 110 via cables 116 and 118 (including electrical or optical conductors) which are detachably connectable from data communication interface 114. The electrical or optical conductors may be referred to as "physical" conductors. Computer 102 has a data communication interface which may be similar to data communication interface 114. Computer 102 is operative to communicate with peripheral device 104 over two full-duplex paths provided by cables 116 and 118, but this is not essential.

In FIG. 2, computer system 200 includes a computer 202, a computer 204, and a peripheral device 206. Computers 202 and 204 are electrically powered from power sources 208 and 210, respectively, whereas peripheral device 206 is electrically powered from a power source 212. Peripheral device 206 has peripheral device components 216, including peripheral device components 218 and 220, which are carried and disposed in a housing designated by solid line boundaries of FIG. 2. A power supply 214 is also disposed in the housing and is detachably connected to power source 210 via a power source interface (not shown in FIG. 2), which may include a power cord. Peripheral device 206 has data communication interfaces 222 and 224 carried with the housing and coupled to peripheral device components 216. Each of data communication interfaces 222 and 224 may include connectors and be carried on an adapter card, such as an adapter card 226 designated by dashed lines of FIG. 2. Each of data communication interfaces 222 and 224 are adapted for coupling with a computer or with another peripheral device through cables.

Computer 202 is coupled to and communicates with peripheral device components 216 via cables 228 and 230 (including electrical or optical conductors) which are detachably connectable to data communication interface 222 Computers 202 and 204 have data communication interfaces which may be similar to or the same as data communication interfaces 222 and 224. Each of computers 202 and 204 are operative to communicate to peripheral device 206 over two full-duplex paths provided by the cables.

FIG. 3 shows computer system 300 which includes a plurality of computers 301, a peripheral device 308, and a peripheral device 310. The plurality of computers 301 includes computers 302, 304, and 306, which are electrically powered from power sources 312, 314, and 316, respectively. Peripheral device 308 is electrically powered from a power source 318. Peripheral device 308 has peripheral device components 320 and a power supply 322, all of which are carried and disposed in a housing designated by solid line boundaries of FIG. 3. Power supply 322 is detachably connectable with power source 318 via a power source interface (not shown in FIG. 3), such as a power cord. Peripheral device 308 has a plurality of data communication interfaces 331 carried with the housing and coupled to peripheral device components 320. The plurality of data communication interfaces 331 are each adapted for coupling with a computer or with another peripheral device through cables. Each of data communication interfaces 331 may include connectors and be carried on an adapter card, such as an adapter card 338 designated by dashed lines in FIG. 3.

Peripheral device 308 provides for connection to peripheral device components 320 in a serial loop-type configuration. One port of data communication interface 332 is coupled to a first end of peripheral device components 324 and the other port is coupled to a first end of peripheral device components 326. One port of data communication interface 340 is coupled to a second end of peripheral device components 324 and the other port is coupled to a first end of peripheral device components 328. One port of data communication interface 342 is coupled to a second end of peripheral device components 328 and the other port is coupled to a first end of peripheral device components 330. Finally, one port of data communication interface 344 is coupled to a second end of peripheral device components 330 and the other port is coupled to a second end of peripheral device components 326.

As illustrated in FIG. 3, the plurality of computers 301 and peripheral devices 308 and 310 are serially coupled in loop-type fashion. Computer 302 is coupled to and communicates with peripheral device components 320 via cables 334 and 336 (having electrical or optical conductors), which are detachably connected to data communication interface 332. Computers 304 and 306 are similarly coupled and communicative. Each of the plurality of computers 301 has a data communication interface which may be similar to data communication interfaces 331. Each computer is operative to communicate with peripheral devices 308 and 310 over two full-duplex paths as shown.

Peripheral device 310, which includes peripheral device components 311 coupled to a data communication interface 313, may include similar or the same components as one of peripheral devices 104, 206, and 308 (FIGS. 1, 2, and 3). Peripheral device 310 is coupled to peripheral device 308 using suitable cables connected between data communication interfaces 313 and 344.

A line 341 is shown to indicate a large distal and/or physical separation between the plurality of computers 301 and peripheral devices 308 and 310, which may be necessary in some applications. For example, peripheral devices 308 and 310 may include data storage devices for backup storage and be located in an isolated, fireproof vault away from the plurality of computers 301.

Figure 8:
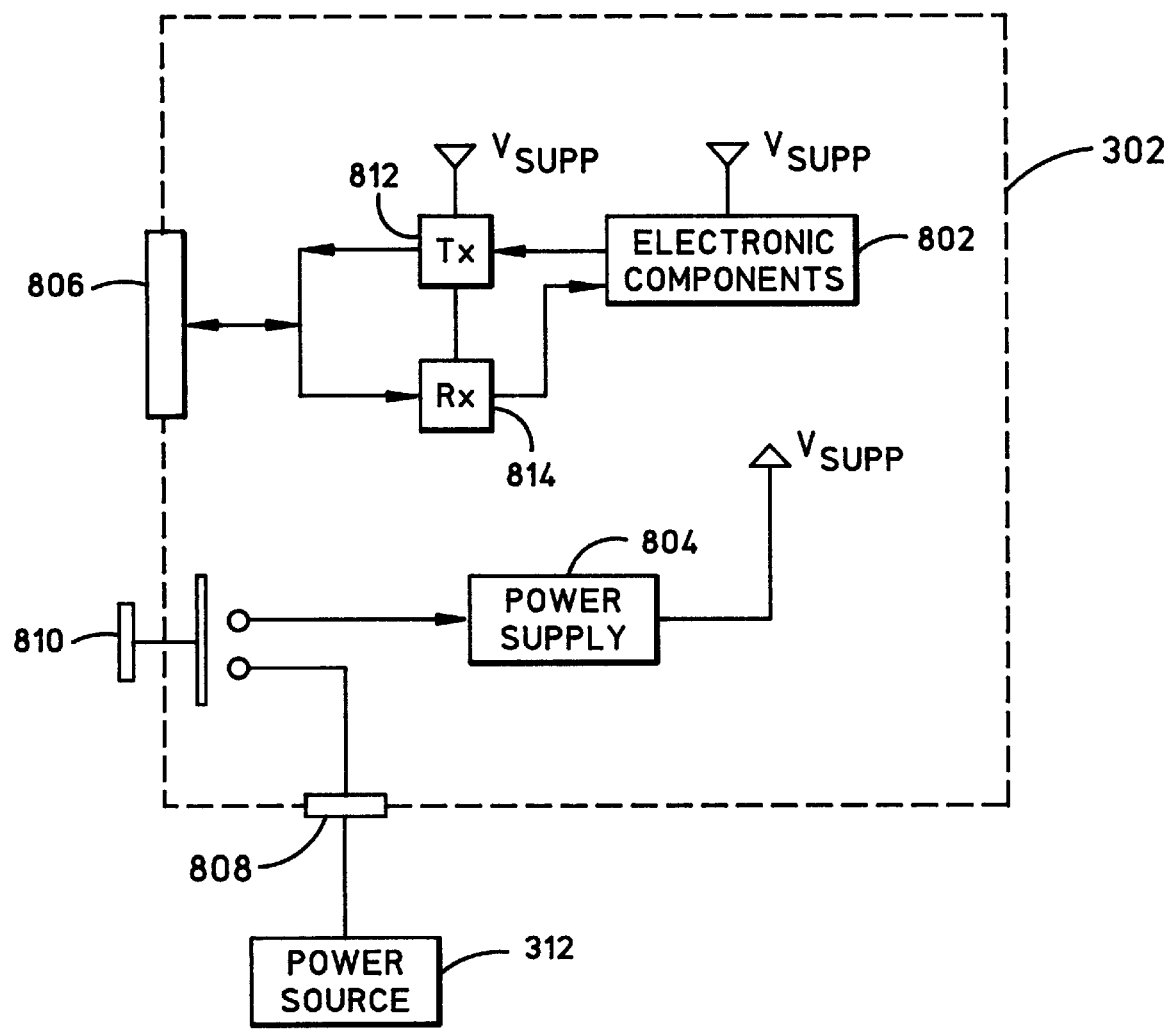
FIG. 8 is a simple block diagram of a conventional computer.

Referring now to FIG. 8, a block diagram of computer 302 is shown which may be representative of each of the plurality of computers 301 and others described herein. Computer 302 includes electronic components 802, which are supplied electrical power from power supply 804 during typical operation. Electronic components 802 may include conventional electronic components of a computer, such as a central processing unit (CPU), memory devices, etc. Electronic components 802 are coupled to a data transmitter 812 and a data receiver 814, which are coupled to a data communication interface 806. Data communication interface 806 may include suitable connectors and be carried on an adapter card. Data transmitter 812 and data receiver 814 may also be carried on the adapter card. Computer 302 has a power source interface 808, which may include a power cord, switchably coupled to power supply 804 and adapted for coupling with power source 312. The supply of electrical power to electronic components 802 may be terminated with an actuation of an actuable switch 810 (e.g., a conventional ON/OFF switch or other suitable switching means), which has an ON position and an OFF position to place computer 302 in a computer ON state and a computer OFF state, respectively.

Referring back to FIGS. 1–3, in one embodiment, computer systems 100, 200, and 300 may utilize Serial Storage Architecture (SSA) as the interconnect architecture. That is, the necessary components (data communication interfaces, cables, peripheral device components, etc.) are configured in accordance with SSA using components presently available and known in the art. One such SSA data storage device is the IBM 7133, presently available from International Business Machines (IBM) Corporation.

SSA is a serial interface specifically designed to connect I/O devices such as those including disk drives, tape drives, CD ROM drives, optical drives, printers, scanners, and other components to computers and storage subsystems. Each SSA link is full-duplex and frame multiplexed simultaneously, resulting in data rates in the 40 MB/sec range (for example) in each direction, with total throughput of 160 MB/sec (for example) at each node. Only four signal wires are required (a differential "twisted pair" utilized for both receive and transmit). Those skilled in the art are familiar with the implementation of SSA and therefore the architecture and its operation will not be described in any more elaborate detail. For a further explanation of SSA, see "Information Technology-Serial Storage Architecture-Transport Layer 1 (SSA-TL1), American National Standards Institute (ANSI) X3T10/0989D". "Information Technology-Serial Storage Architecture-Physical 1 (SSA-PH1), ANSI X3T10.UXXXD", and "Information Technology-Serial Storage Architecture-SCSI-2 Protocol (SSA-S2P), ANSI JUT10.1/121D".

As one skilled in the art will readily understand, however, the present invention is not limited to SSA; the computer system may utilize other suitable architectures and components. In another embodiment, for example, a computer system may utilize "Fibre channel" technology as the interface architecture. Fibre channel is the general name of another well-known integrated set of standards documented by ANSI defining protocols for information transfer.

Figure 4:
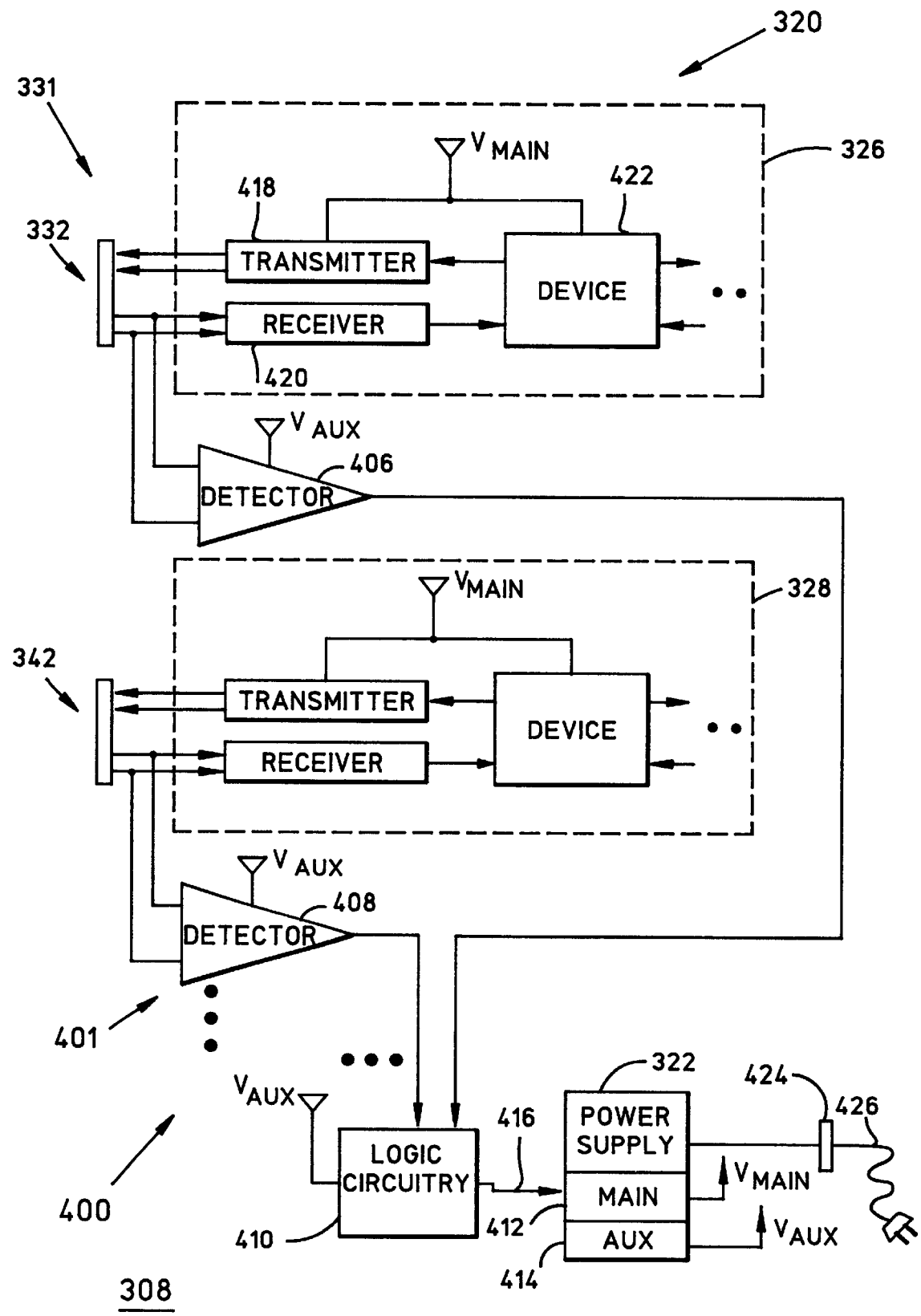
FIG. 4 is a schematic block diagram of relevant electronic components and circuitry employed in the peripheral device of FIG. 3, forming a remote and automatic power control apparatus.

Referring now to FIG. 4, relevant portions of electronic components and circuitry which may be employed in peripheral device 308 of FIG. 3 is shown. Such electronic components and circuitry may be applied similarly in peripheral devices 104 and 206 of FIGS. 1 and 2. Preferably, some or all of such components are placed on the adapter cards of the peripheral devices, such as adapter card 332.

Each of peripheral device components 320 of FIG. 4 include suitable components for device functionality and data communication. Peripheral device components 326, for example, includes a data transmitter 418, a data receiver 420, and a device 422. Device 422 may include, for example, a data storage component (e.g., a disk drive employing a magnetic disk) for the plurality of computers 301 (FIG. 3) to read and write data. Device 422 is coupled to data transmitter 418 and data receiver 420, which are coupled to data transmit lines and data receive lines, respectively.

Peripheral device 308 also includes detector circuitry 400 having a plurality of detectors 401 (such as detectors 406 and 408) and logic circuitry 410. Preferably, the number of detectors is equal to the number of data communication interfaces adapted for coupling with a computer. For computer system 300 of FIG. 3, the number of detectors is preferably four. Detector 406 has inputs coupled to the receive data lines of data communication interface 332 and an output coupled to a first input of logic circuitry 410. Likewise, detector 408 has inputs coupled to the receive data lines of data communication interface 342 and an output coupled to a second input of logic circuitry 410. Other detectors are similarly coupled.

Detector 406 is operative to detect communication link inactivity between computer 302 and peripheral device 308, and can also detect communication link activity therebetween. In response to detecting communication link activity and inactivity, detector 406 produces an appropriate signal to logic circuitry 410. Detector 408 and other detectors are similarly operative.

Communication link activity includes those signals present on data lines when a computer is powered ON, whether the activity is non-idle activity (active data communication) or idle activity (no active data communication). Data is communicated, for example, when writing and reading data to and from data storage components. Communication link inactivity includes those signals present (if any) on data lines when the computer is powered OFF. With a continuously clocked serial link, for example, a clock signal is provided from each of the plurality of computers 301 when powered ON (even when data is not being communicated); a clock signal loss from each one of the plurality of computers 301 occurs when it is powered OFF or disconnected from peripheral device 308. Such continuously clocked serial links are provided in computer systems utilizing SSA or Fibre channel technology, for example.

Power supply 322 is divided into a main power supply 412 and an auxiliary power supply 414. A power cord 426 of power supply 322 is connectable to a suitable power source, such as a power source provided at a common AC electrical outlet. During typical operation, an output of main power supply 412 ($V_{MAIN}$) supplies electrical power to peripheral device components 402 and 404 in a peripheral device ON state; an output of auxiliary power supply 414 ($V_{AUX}$) supplies electrical power to detector circuitry 400. The electrical power supplied from main power supply 412 is relatively large in comparison to the electrical power supplied from auxiliary power supply 414.

Main power supply 412 has a power control input 416 which is coupled to an output of logic circuitry 410. When a power up signal is applied at power control input 416, main power supply 412 supplies the electrical power to peripheral device components 320. However, when a power down signal is present at power control input 416, main power supply 412 terminates supply of electrical power to peripheral device components 320 and peripheral device 308 is in a peripheral device OFF state.

Figure 5:
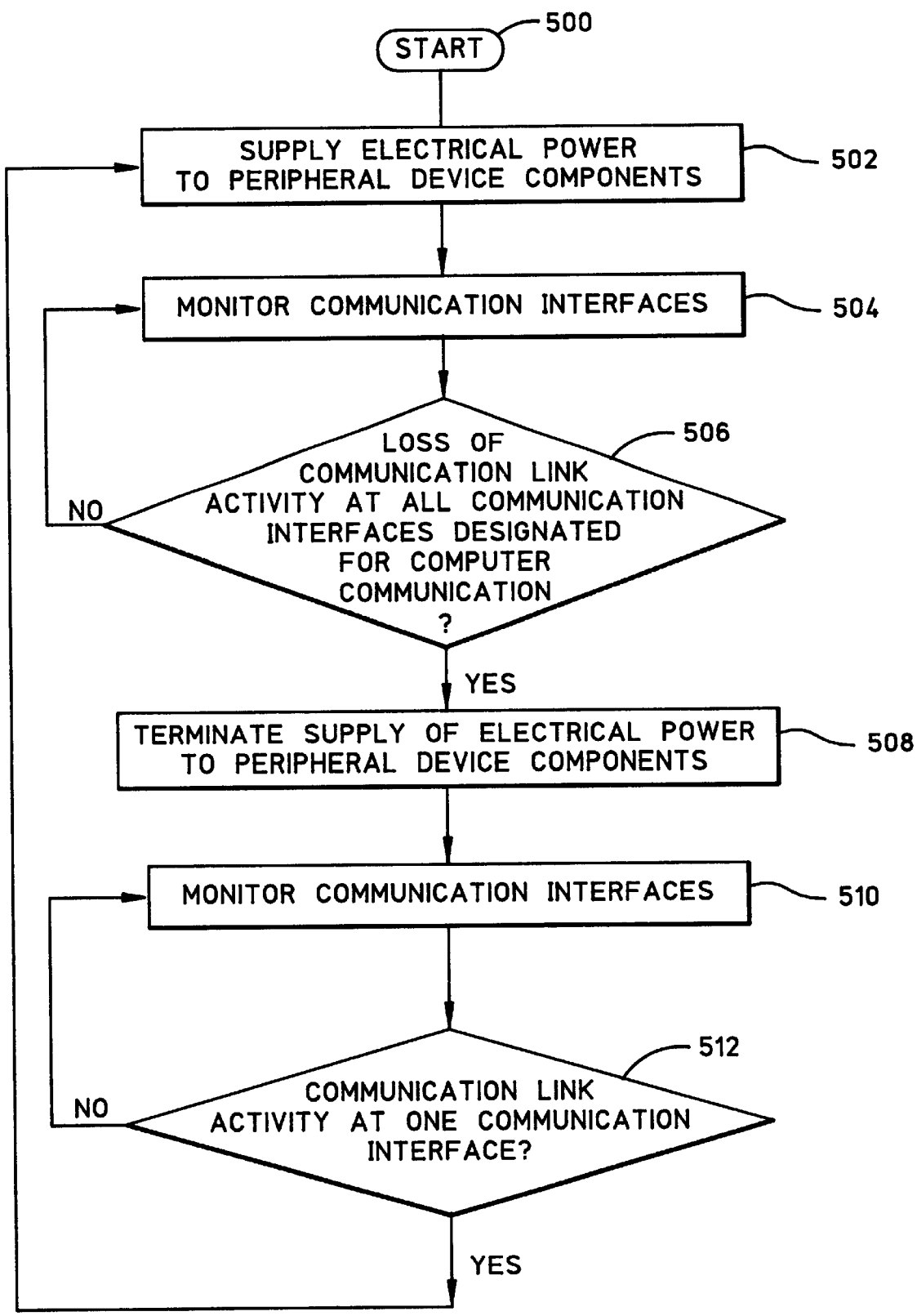
FIG. 5 is a flowchart describing a method of controlling supply of power to a peripheral device using the remote and automatic power control apparatus.

FIG. 5 is a flowchart describing typical operation of a remote and automatic power control apparatus. In the following description, FIGS. 3, 4, and 5 will be referred to in combination. Starting at a start block 500, main power supply 412 supplies electrical power to peripheral device components, which are in a substantially powered up state (step 502). At this time, the plurality of computers 301 (FIG. 3) connected to data communication interfaces 331 are powered ON and operating, and are capable of communicating with peripheral device 308. Communication link activity is present at at least one of the plurality of data communication interfaces 331.

Detector circuitry 400 monitors the plurality of data communication interfaces 331 (step 504). More specifically, detector circuitry 400 monitors whether there is communication link inactivity at each one of data communication interfaces 331 designated for computer communication. In this embodiment, the data communication interfaces designated for computer communication are data communication interfaces 332, 340, and 342. On the other hand, data communication interface 344 is designated for coupling with another peripheral device (peripheral device 310, as shown in FIG. 3). The appropriate detection at step 504 will occur when all of computers 302, 304, and 306 are either powered OFF (e.g., using switches such as actuable switch 810 of FIG. 8) or disconnected from peripheral device 308. Detector circuitry 400 continues monitoring at step 504 if such inactivity is not detected at step 506. Peripheral device 308 remains in the substantially powered up state for use by any one of the plurality of computers 301.

At some time, however, all of the plurality of computers 301 are powered OFF. Detector circuitry 400 detects communication link inactivity at each one of data communication interfaces 332, 340, and 342, and signals main power supply 412 to terminate supply of electrical power to peripheral device components 320 (step 508). Here, peripheral device components 320 are in a substantially powered down state.

Auxiliary power supply 414 continues to supply electrical power to detector circuitry 400, which monitors the plurality of data communication interfaces 331 for communication link activity (step 510). Peripheral device components 320 remain in the substantially powered down state if no such detection occurs at step 512, where detector circuitry 400 continues monitoring the plurality of data communication interfaces 331 at step 510.

When communication link activity is detected at a single data communication interface by detector circuitry 400 at step 512, detector circuitry 400 signals main power supply 412 to resupply electrical power to peripheral device components 320 (step 502). The method repeats itself at step 502. It is noted that, although steps 504 and 510 are separated for clarity, such steps are preferably performed continuously during detector operation.

Thus, a peripheral may be automatically powered up/down in immediate response to link activity/inactivity—without the need for any other actions—manual or otherwise (except perhaps intended delay as described further below).

Figure 6:
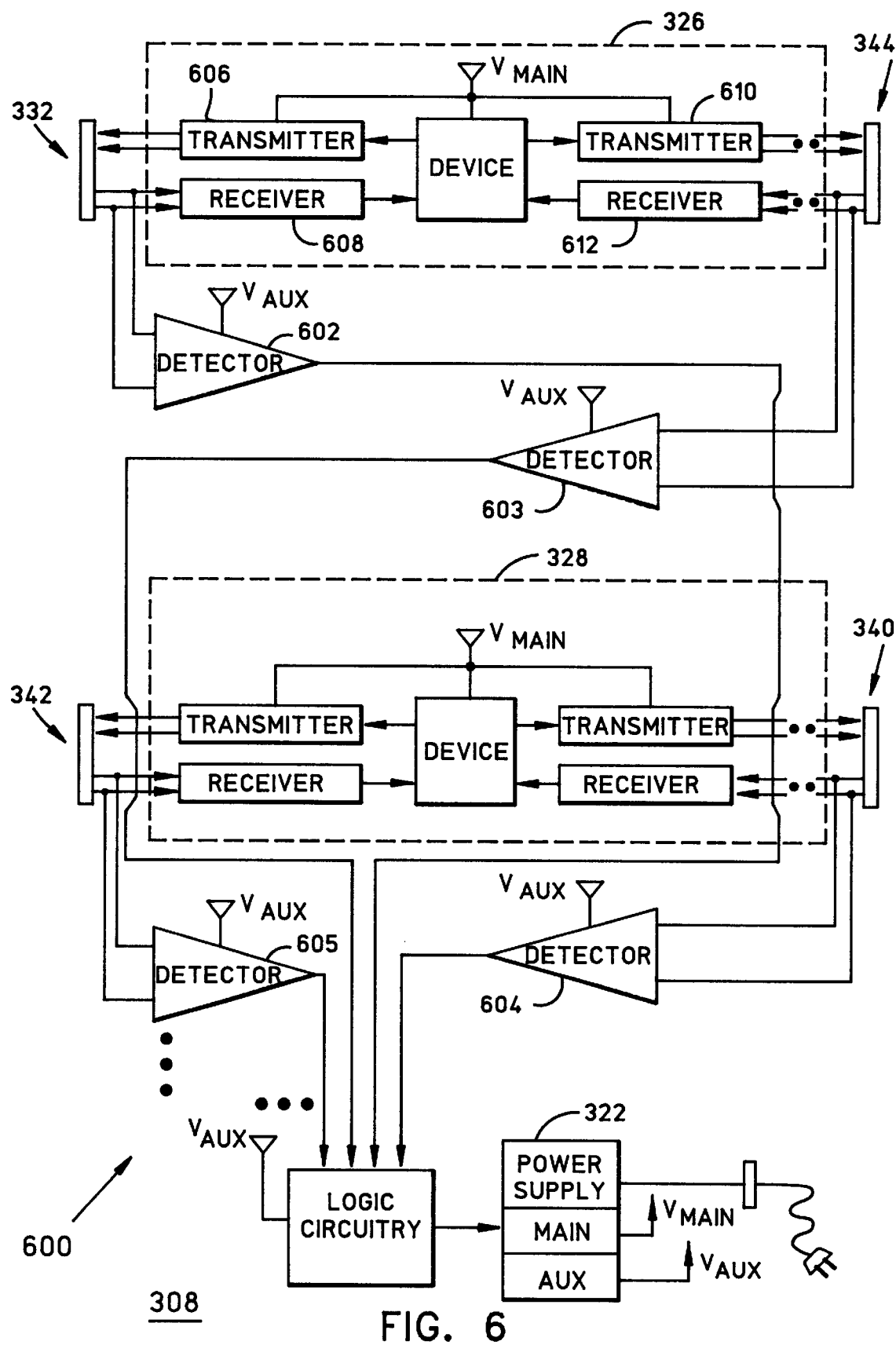
FIG. 6 is another schematic block diagram of relevant electronic components and circuitry employed in the peripheral device of FIG. 3, forming a remote and automatic power control apparatus.

FIG. 6 is another embodiment of relevant portions of electronic components and circuitry employed in peripheral device 308 of FIG. 3. Here, peripheral device components include dual transmitters and receivers, such as data transmitters 606 and 610 and data receivers 608 and 612 of peripheral device component 326 coupled as shown. Four detectors are shown; detector 602 connected at data communication interface 332; detector 603 connected at data communication interface 344; detector 605 connected at data communication interface 342; and detector 604 connected at data communication interface 340. Detector circuitry 600 operates the same as or similarly to that described in relation to FIGS. 4 and 5.

It is understood that in relatively complex implementations of computer systems, limitations exist on the use of such power control as one skilled in the art will understand. For example, the present invention is better suited to SSA implementations where only computers or only peripheral devices are coupled to a data communication interface.

Figure 7:
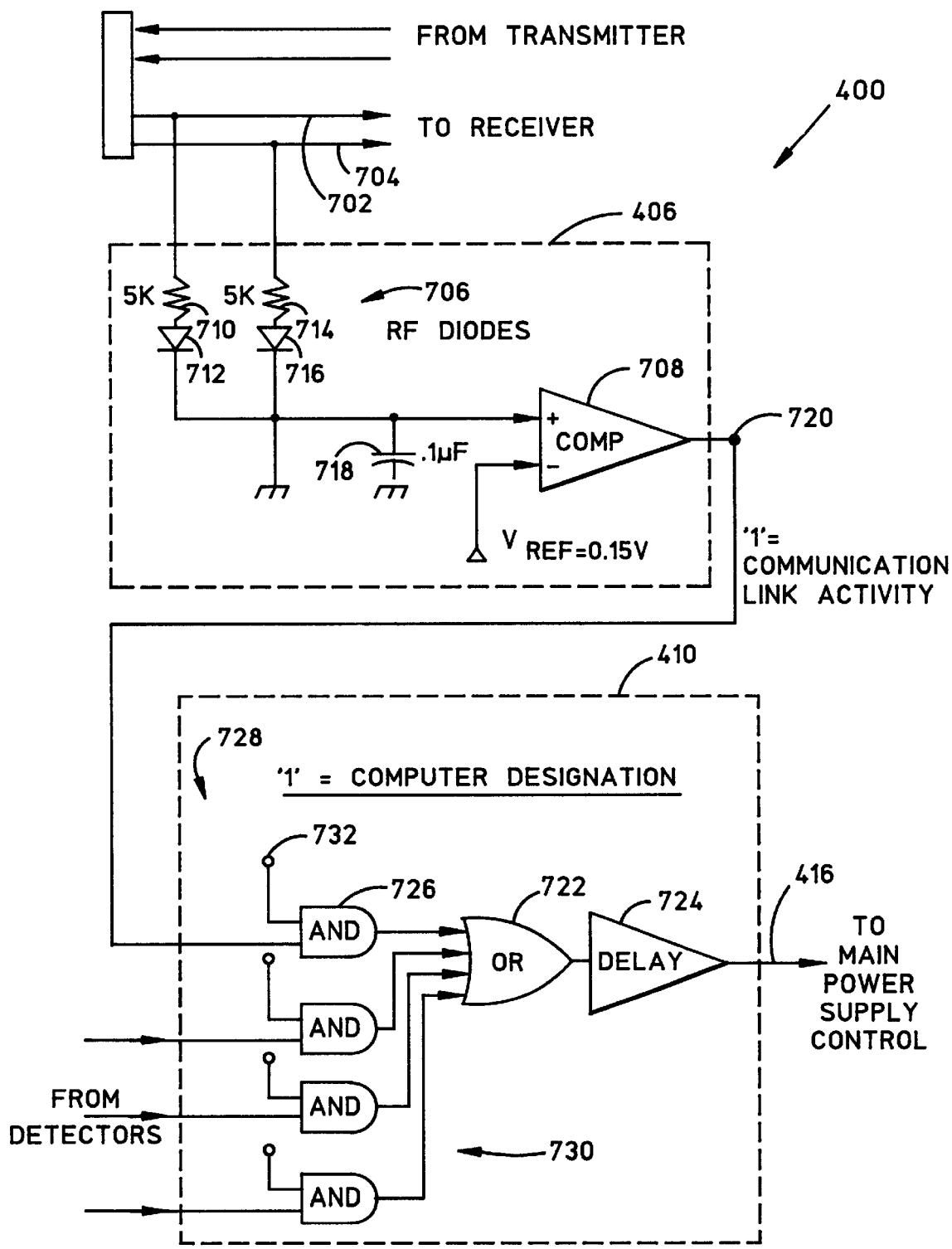
FIG. 7 is a schematic diagram of a particular and preferred version of detector circuitry, suitable for use with a continuously clocked serial communication link, and a particular version of logic circuitry.

FIG. 7 is a schematic diagram of a particular and preferred version of detector circuitry 400, which may be used in a system employing a continuously clocked serial link such as SSA or Fibre channel, and a particular version of logic circuitry 410. For clarity, FIG. 7 shows only detector 406 which is preferably representative of all other detectors. Here, detector 406 may be referred to as a clock signal detector and/or a clock signal loss detector. Detector 406 includes a rectifier circuit 706 and a comparator circuit 708, having electrical components as shown and coupled. Receive data lines 702 and 704 are coupled to an input of rectifier circuit 706. Comparator circuit 708 has a first input coupled to an output of rectifier circuit 706, a second input coupled to a reference voltage, and an output 720 coupled to an input of logic circuitry 410.

Rectifier circuit 706 more specifically includes resistors 710 and 714, diodes 712 and 716, which are radio frequency (RF) diodes, and a capacitor 718. Receive data line 702 is coupled to a first end of resistor 710, which has a second end coupled to a first end of diode 712. Receive data line 704 is coupled to a first end of resistor 714, which has a second end coupled to a first end of diode 712. Second ends of diodes 712 and 716 are coupled together and to a first end of capacitor 718 having a second end coupled to ground. Comparator circuit 708 is a voltage comparator operative to produce a logic '1' at output 720 when the output of rectifier circuit 706 exceeds the reference voltage. Comparator circuit 708 is operative to produce a logic '0' at output 720 when the output of rectifier circuit 706 drops below the reference voltage. Although the above circuit elements are preferred, one skilled in the art will understand that other suitable elements can be utilized as well (e.g., diode coupling may be replaced by capacitive coupling).

Logic circuitry 410 includes an OR gate 722 followed by a delay circuit 724, which has an output coupled to power control input 416. When one or more detectors designated for computer communication detect communication link activity, OR gate 722 will produce a logic '1' output for signaling power control input 416 of main power supply 412 to enable supply of electrical power. On the other hand, when all detectors designated for computer communication detect communication link inactivity, OR gate 722 will produce a logic '0' output so that main power supply 412 terminates the supply of power. Before signals reach main power supply 412, a delay time is imposed by delay 724, providing some desirable hysteresis for the system.

Logic circuitry 410 also includes interface designators 728 and detector bypasses 730. Each one of interface designators 730 is associated with one data communication interface and detector. Each designator designates whether the interface is coupled to a computer or to another peripheral device. Interface designator 732 is set to a logic '1' if the associated data communication interface is coupled for computer communication; otherwise, interface designator 732 is set to a logic '0'. Preferably, the designations are preferably established during an initial configuration of computer system 300.

Each one of detector bypasses 730 is associated with one data communication interface and detector, and is utilized for bypassing or ignoring decisions of a detector coupled to a data communication interface not designated for computer communication (i.e., designated for coupling with another peripheral device). Here, detector bypasses 730 include AND gates as shown. For example, an AND gate 726 has a first input coupled to an interface designator 732, a second input coupled to output 720 of detector 406, and an output coupled to an input of OR gate 722. Thus, for data communication interfaces not designated for computer communication (set to logic '0'), OR gate 722 always receives a logic '0' signal which provides bypassing of the associated detector.

Several variations may be made to detector circuitry 400 of FIG. 7. For example, a microcontroller or microprocessor with suitable embedded software may replace logic circuitry 410, or replace both logic circuitry 410 and comparator 708. Also for example, in place of the AND gates of detector bypasses 730, simple conductive jumpers (not shown) may be utilized and located at the inputs or outputs of detectors; physical or software switches may also be utilized and set appropriately.

Thus, a peripheral device may be automatically powered down in response to a plurality of computers of the computer system being powered down. The peripheral device is powered down when no component of the computer system is powered ON to communicate with it. Such control of power is especially convenient for remotely located peripheral devices connected with very long connector cables. The present invention is preferably utilized in computer systems having continuously clocked serial links, such as those utilizing Fibre channel and SSA as the interface architecture. The preferred version of such a remote and automatic power control apparatus requires no special hardware or software at the host computers, no special software at the peripheral device, and only a small amount of simple, low-cost hardware at the peripheral device.

It should be understood that modifications to the above described embodiments may be made without departing from the true spirit and scope of the present invention, as will be apparent to those skilled in the art.

I claim:

1. A data storage device for utilization in a computer system having one or more computers and communicative over a continuously clocked serial link, said data storage device comprising:
a housing;
a power supply;
data storage components, said data storage components carried in said housing, said data storage components having a substantially powered up state and a substantially powered down state, said data storage components operative to enter the substantially powered down state responsive to a power down signal;
one or more data communication interfaces, said data communication interfaces carried on said housing and coupled to said data storage components, each of said data communication interfaces adapted for coupling with a computer through conductors; and
detector circuitry, said detector circuitry operative to detect a loss of a clock signal for an active communication link at each one of said data communication interfaces and to produce the power down signal in response thereto.

2. A data storage device according to claim 1, wherein said detector circuitry is operative to detect the clock signal loss at each one of said data communication interfaces designated for computer communication.

3. A data storage device according to claim 1, wherein said detector circuitry is operative to detect a clock signal on at least one of said data communication interfaces and to terminate the power down signal in response thereto.

4. A data storage device according to claim 1, wherein said data storage components comprise at least one of a disk drive, a CD-ROM drive, a tape drive, and an optical drive.

5. A data storage device according to claim 1, wherein said power supply is adapted for coupling with a power source that is separate and apart from a power source of the computers.

6. A data storage device according to claim 1, wherein said data storage device is configured in accordance with one of Fibre channel and Serial Storage Architecture (SSA) standards.

7. A data storage device according to claim 1, wherein said detector circuitry comprises:
at least one diode coupled to a data communication interface; and
a comparator having a first input coupled to said at least one diode and a second input coupled to a reference voltage.

8. A peripheral device, comprising:
a housing;
peripheral device components, said peripheral device components disposed in said housing, said peripheral device components having a substantially powered up state and a substantially powered down state;
a power supply, said power supply operative to supply electrical power to said peripheral device components when in the substantially powered up state;
at least one data communication interface, said at least one data communication interface carried with said housing and coupled to said peripheral device components, each one of said at least one data communication interface adapted for coupling with a computer through conductors; and
detector circuitry, said detector circuitry operative to cause said peripheral device components to enter the substantially powered down state in response to detecting communication link inactivity at each one of said at least one data communication interface.

9. A peripheral device according to claim 8, further comprising:
said detector circuitry operative to cause said peripheral device components to enter the substantially powered up state in response to detecting communication link activity on at least one of said at least one data communication interfaces.

10. A peripheral device according to claim 8, further comprising:
a power source interface of said power supply, said power source interface adapted for coupling with a power source.

11. A peripheral device according to claim 7, wherein said peripheral device is configured in accordance with Fibre channel standards.

12. A peripheral device according to claim 7, wherein said peripheral device is configured in accordance with Serial Storage Architecture (SSA) standards.

13. A method of controlling a supply of electrical power to a peripheral device, the peripheral device having peripheral device components operative for data communication with one or more computers, the peripheral device operable from a power source separate and apart from those of the computers, the method comprising:
supplying electrical power to the peripheral device components so that the peripheral device components are substantially operative;
detecting communication link inactivity at each one of a plurality of data communication interfaces; and
in response to detecting the communication link inactivity, terminating supply of electrical power to the peripheral device components so that the peripheral device components are substantially inoperative.

14. A method according to claim 13, further comprising:
detecting communication link activity on at least one of the plurality of data communication interfaces; and
in response to detecting the communication link activity, supplying electrical power to the peripheral device components so that the peripheral device components are substantially operative.

15. A method according to claim 13, wherein detecting the communication link inactivity comprises detecting a clock signal loss.

16. A method according to 13, wherein detecting the communication link inactivity comprises detecting a clock signal loss and detecting the communication link activity comprises detecting a clock signal.

17. A method according to claim 13, wherein supplying electrical power to the peripheral device components comprises supplying electrical power to data storage components of the peripheral device.

18. A computer system, comprising:
at least one computer, including:
a first housing;
first electronic components, said first electronic components disposed in said first housing and substantially operative in a computer ON state and substantially non-operative in a computer OFF state;

a first power source interface, said first power source interface adapted for coupling with a first power source that supplies electrical power to said first electronic components in the computer ON state;

a first actuable switch, said first actuable switch carried on said first housing and actuable to an ON position and to an OFF position for invoking the computer ON and OFF states, respectively;

a data transmitter, said data transmitter operative to generate signals at a transmitter output in the computer ON state and to terminate generation of the signals in the computer OFF state;

a first data communication interface, said first data communication interface coupled to said transmitter output;

a peripheral device, including:

a second housing separate and apart from said first housing; peripheral device components, said peripheral device components carried on said second housing, said peripheral device components substantially operative in a peripheral device ON state and substantially non-operative in a peripheral device OFF state;

a second power source interface, said second power source interface adapted for coupling with a second power source that supplies electrical power to said peripheral device components in the peripheral device ON state and that is separate and apart from the first power source;

a plurality of data communication interfaces, said plurality of data communication interfaces carried with said housing, each of said plurality of data communication interfaces adapted for coupling with one said first data communication interface of said plurality of computers through cables; and detector circuitry, said detector circuitry operative to detect the loss of a clock signals for an active communication link from each of said computers and to set said peripheral device in the peripheral device OFF state in response thereto.

19. The computer system according to claim 18, wherein said detector circuitry is operative to detect the signals from at least one of said plurality of computers and to set said peripheral device to the peripheral device ON state in response thereto.

20. The computer system according to claim 18, wherein each said data transmitter of said plurality of computers is operative to generate signals in the computer ON state comprising a continuous clock signal.

* * * * *